Feb. 12, 1952     A. C. JOHNSON ET AL     2,585,327
DISPENSING REEL FOR FISHING LEADERS AND THE LIKE

Filed Nov. 1, 1950

Arthur C. Johnson
Harold B. Collins
Oscar H. Johnson
          INVENTORS

BY *Clarence A. O'Brien*
*and Harvey B. Jackson*
              Attorneys

Patented Feb. 12, 1952

2,585,327

UNITED STATES PATENT OFFICE 2,585,327

DISPENSING REEL FOR FISHING LEADERS AND THE LIKE

Arthur C. Johnson, Harold B. Collins, and Oscar H. Johnson, Breedsville, Mich.; said Arthur C. Johnson and said Oscar H. Johnson assignors to said Collins Application November 1, 1950, Serial No. 193,478

2 Claims. (Cl. 242—138)

The present invention relates to new and useful improvements in a dispensing reel for use in dispensing fishing leaders or similar coils of material from dispensing containers.

An important object of the same is to provide a novel reel construction which may be manufactured at low cost by stamping the same from sheet metal to form an uninterrupted flange at one side of the reel and radially projecting tongues at the other side of the reel to form the second flange of the reel.

Another object of the invention is to form notches between the radially projecting tongues to facilitate bending of the tongues and constructing one of the notches of V-shape to anchor one end of the leader therein.

A still further object is to provide a device which is of simple and practical construction, attractive in appearance and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
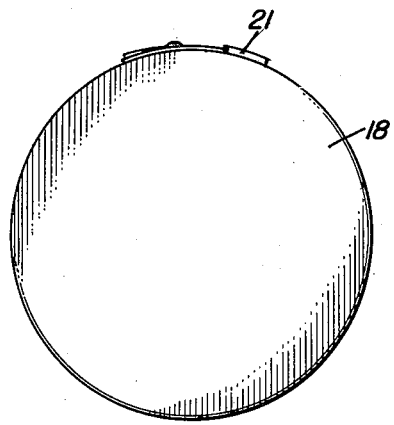
Figure 1 is a side elevational view of a dispensing container for the reel and leader.
Figure 3:
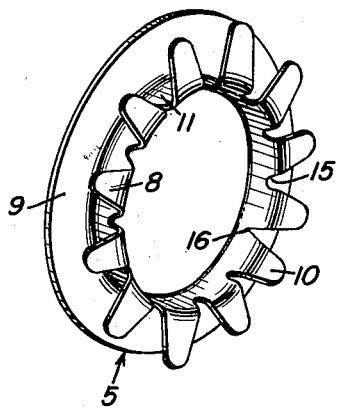
Figure 3 is a perspective view of one of the reels.
Figure 2:
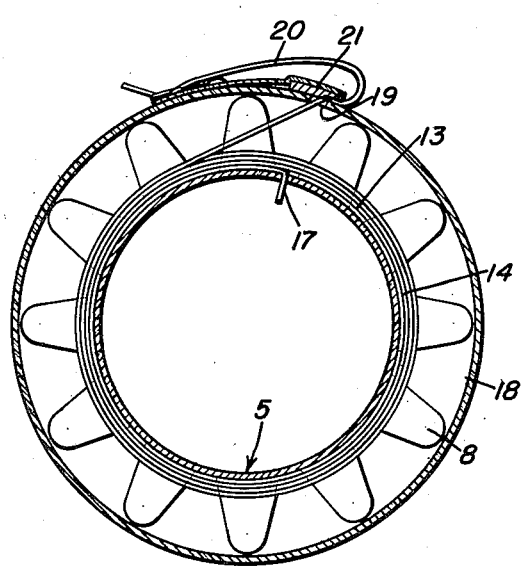
Figure 2 is a circumferential sectional view.
Figure 5:
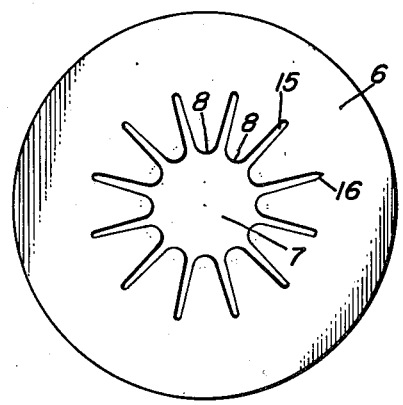
Figure 5 is a plan view of the blank from which the reel is stamped.
Figure 4:
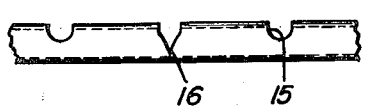
Figure 4 is a fragmentary detail of the inner periphery of the reel and showing the notch for anchoring the leader thereto.

Referring now to the drawing in detail wherein for the purpose of illustration we have disclosed a preferred embodiment of the invention. The numeral 5 designates the reel generally and which is constructed of a sheet metal disc 6 having a central opening 7 stamped to form a plurality of tongues 8.

The tongues 8 are bent radially outwardly substantially parallel to the plane of the disc and spaced therefrom to form a reel having an uninterrupted flange 9 and a toothed flange 10 in the form of the tongues 8 and with a channel 13 between the flanges 9 and 10 and on which a wire leader 14 is coiled.

Notches 15 are formed between the tongues 8 which extend partly transversely of the channel 11, the notches being rounded to prevent splitting or breaking of the material during the bending operation and one of the notches is constructed of V-shape as shown at 16 to wedge one end 17 of the leader 14 therein to anchor the leader to the reel.

One or more of the reels 5 are placed in a dispensing container 18 of annular construction and provided in its periphery with a dispensing opening 19 through which the free end 20 of the leader is pulled to dispense a desired length of the leader from the reel. The outer end 20 is held between a clamping blade 21 and the side of the container in order that the leader may be grabbed and dispensed from the container.

While the reel is designed particularly for stamping from sheet metal the same may also be manufactured from plastic or other suitable material.

In view of the foregoing description taken in conjunction with the accompanying drawing it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A reel of the class described comprising an annular member forming a solid flange having a central opening, and tongues integrally formed with said member and projecting radially outwardly from the opening and spaced from the member to form a toothed flange opposed to the solid flange and with a channel between the flanges adapted for holding a coil of material.

2. A reel of the class described comprising a solid flange and a toothed flange integrally formed with the solid flange and spaced from each other to form a channel therebetween, and a V-shaped notch between a pair of the teeth of said toothed flange adapted for wedging one end of a coil of material therein when coiled on the reel.

ARTHUR C. JOHNSON.
HAROLD B. COLLINS.
OSCAR H. JOHNSON.

REFERENCES CITED

The following references are of record in the file of this patent:

UNITED STATES PATENTS

| Number | Name | Date |
|---|---|---|
| 1,908,278 | Angell | May 9, 1933 |
| 2,137,618 | Krimmel | Nov. 22, 1938 |

FOREIGN PATENTS

| Number | Country | Date |
|---|---|---|
| 346,394 | France | Nov. 24, 1904 |
| 713,251 | France | Aug. 11, 1931 |